(12) United States Patent
Matsushima et al.

(10) Patent No.: US 7,838,154 B2
(45) Date of Patent: *Nov. 23, 2010

(54) NEGATIVE ELECTRODE FOR NONAQUEOUS SECONDARY BATTERY

(75) Inventors: Tomoyoshi Matsushima, Ageo (JP); Hitohiko Honda, Ageo (JP); Yoshiki Sakaguchi, Ageo (JP); Masahiro Hyakutake, Ageo (JP); Kiyotaka Yasuda, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 1153 days.

This patent is subject to a terminal disclaimer.

(21) Appl. No.: 11/174,645

(22) Filed: Jul. 6, 2005

(65) Prior Publication Data

US 2006/0051677 A1    Mar. 9, 2006

Related U.S. Application Data

(60) Provisional application No. 60/640,236, filed on Jan. 3, 2005.

(30) Foreign Application Priority Data

Sep. 9, 2004 (JP) ............................. 2004-262943
Feb. 23, 2005 (JP) ............................. 2005-047827

(51) Int. Cl.
*H01M 4/80* (2006.01)
(52) U.S. Cl. .................... 429/235; 429/209; 429/231.95
(58) Field of Classification Search .................. 429/233
See application file for complete search history.

(56) References Cited

U.S. PATENT DOCUMENTS

| | | | |
|---|---|---|---|
| 5,162,178 A * | 11/1992 | Ohsawa et al. ............... | 429/213 |
| 5,888,670 A * | 3/1999 | Kawakami ................ | 429/231.4 |
| 5,993,999 A * | 11/1999 | Rivers et al. ................. | 429/244 |
| 6,051,340 A * | 4/2000 | Kawakami et al. ..... | 429/231.95 |
| 6,432,585 B1 * | 8/2002 | Kawakami et al. ........... | 429/233 |
| 2002/0197531 A1 | 12/2002 | Inoue et al. | |
| 2003/0008212 A1 * | 1/2003 | Akashi et al. ............. | 429/231.9 |
| 2003/0108795 A1 | 6/2003 | Tamura et al. | |
| 2004/0091775 A1 | 5/2004 | Nishino et al. | |

(Continued)

FOREIGN PATENT DOCUMENTS

CN    1426610    6/2003

(Continued)

*Primary Examiner*—Dah-Wei D Yuan
*Assistant Examiner*—Patricia Davis
(74) *Attorney, Agent, or Firm*—Young & Thompson

(57) ABSTRACT

A negative electrode 10 for a nonaqueous secondary battery, has an active material layer 2 containing active material particles 2a. The active material layer 2 has a metallic material 4 deposited among the particles by electroplating. The negative electrode 10 has a large number of holes 5 open on at least one side thereof and extending through the thickness of the active material layer. The negative electrode 10 further has a pair of current collecting layers 3a and 3b adapted to be brought into contact with an electrolyte. The active material layer 2 is between the current collecting layers 3a and 3b. The holes 5 open on the negative electrode 10 preferably have an opening area ratio of 0.3% to 30%. At least one of the pair of the current collecting layers 3a and 3b preferably has a thickness of 0.3 to 10 μm.

21 Claims, 11 Drawing Sheets

U.S. PATENT DOCUMENTS

| | | | |
|---|---|---|---|
| 2005/0196670 A1* | 9/2005 | Yamaguchi et al. | 429/200 |
| 2005/0244711 A1* | 11/2005 | Fukui et al. | 429/217 |
| 2006/0121345 A1* | 6/2006 | Yasuda et al. | 429/209 |

FOREIGN PATENT DOCUMENTS

| | | |
|---|---|---|
| JP | 8-050922 | 2/1996 |
| JP | 11-233116 | 8/1999 |
| JP | 2001-076761 | 3/2001 |
| JP | 2001-126717 | 5/2001 |
| JP | 2002-083594 | 3/2002 |
| JP | 2003-168425 | 6/2003 |
| JP | 2005-197217 | 7/2005 |
| TW | 369735 | 9/1999 |
| TW | 431002 | 4/2001 |
| WO | WO2005055345 | * 11/2004 |

* cited by examiner

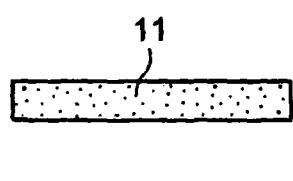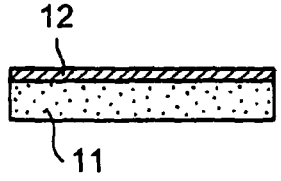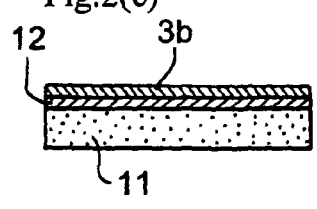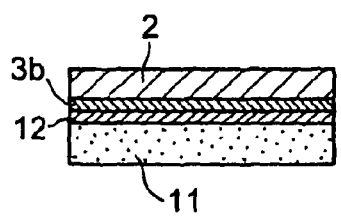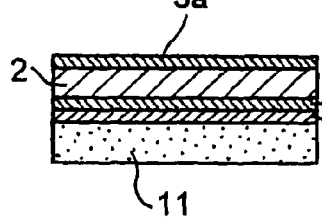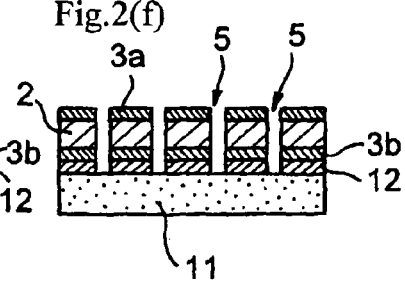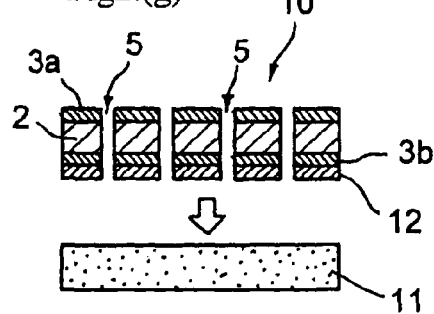
Fig. 3
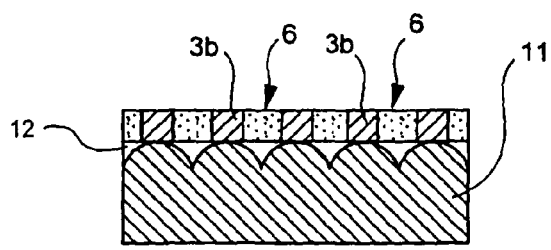

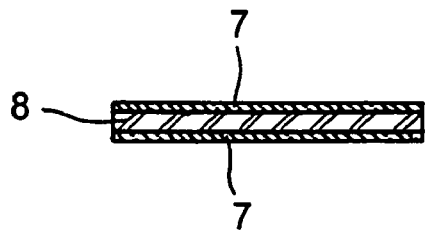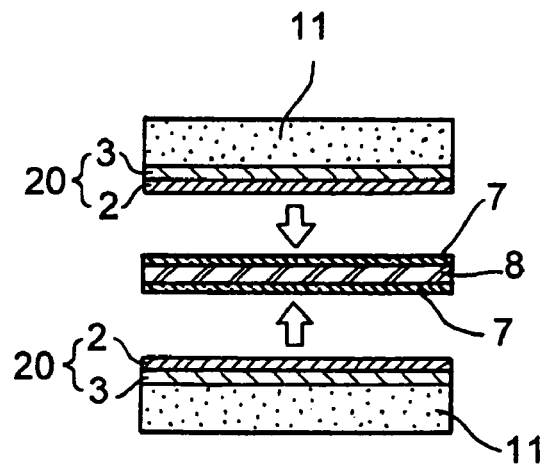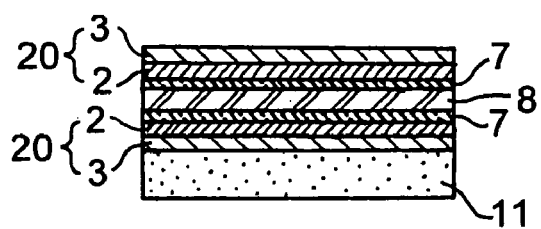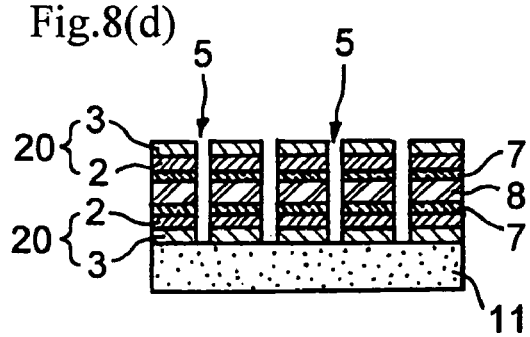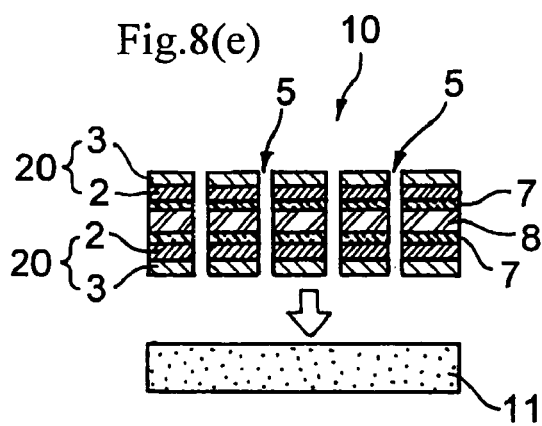

Fig.10(a) The surface where laser beam was applied
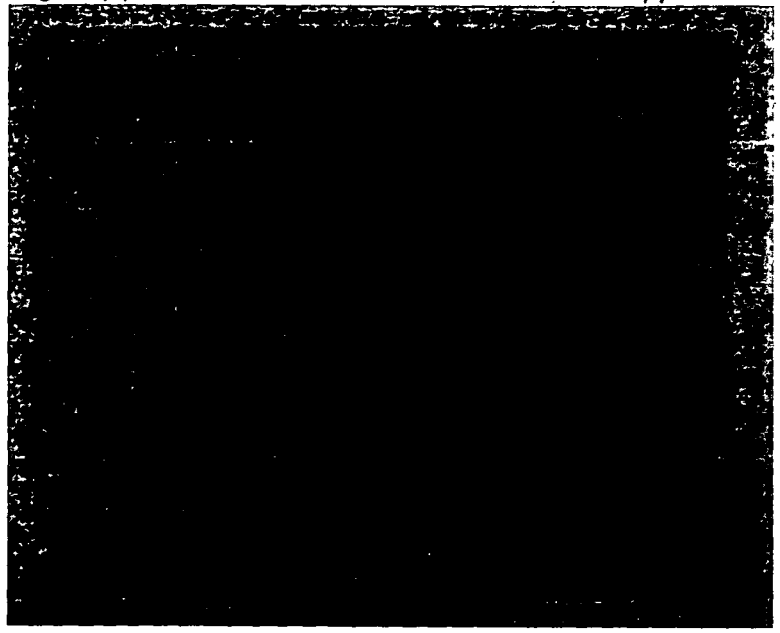
Fig.10(b) The opposite surface

Fig.10(c) The surface where laser beam was applied
After the first cycle
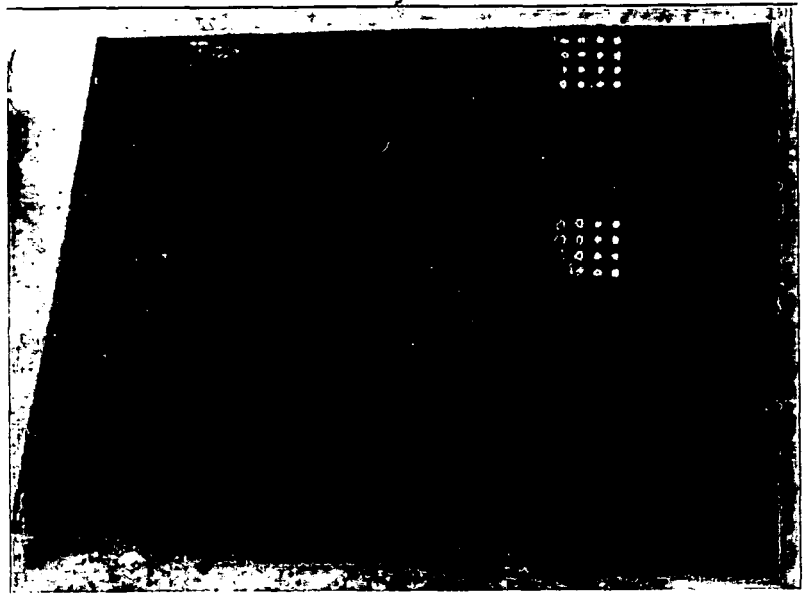
Fig.10(d) The opposite surface
After the first cycle

Fig.11(a) The surface where laser beam was applied
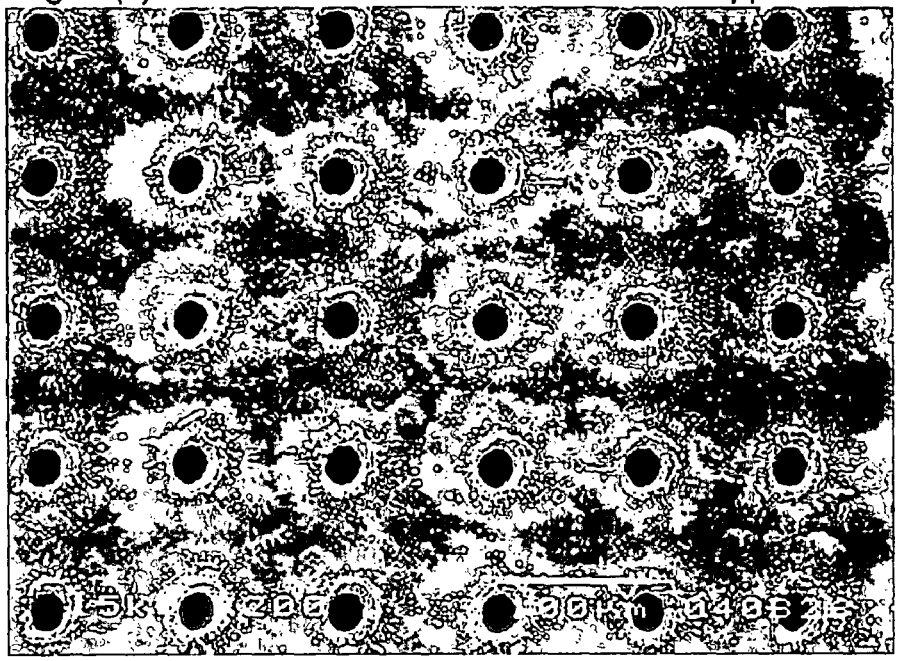
Fig.11(b) The opposite surface
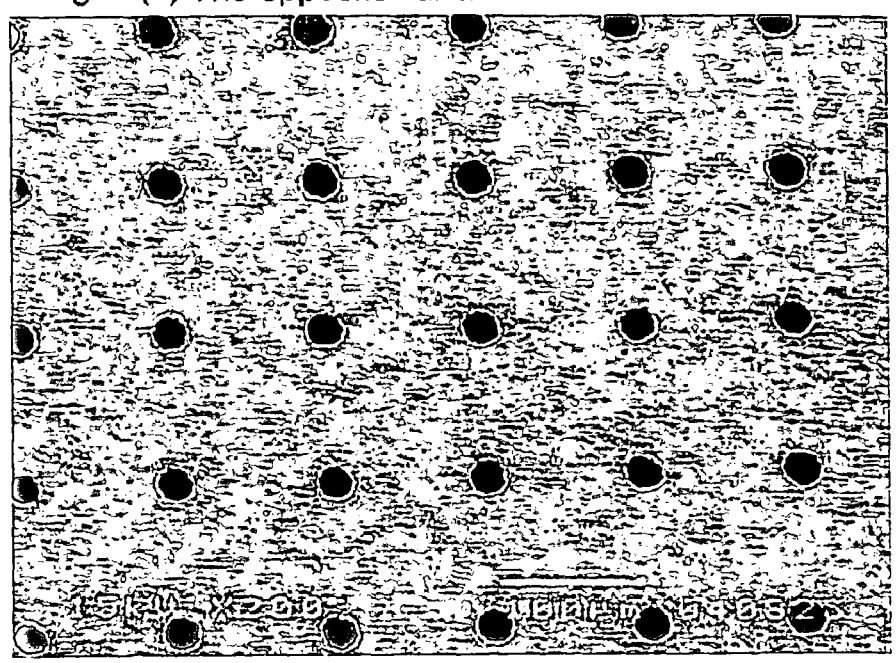

Fig.11(c) Cross sectional view
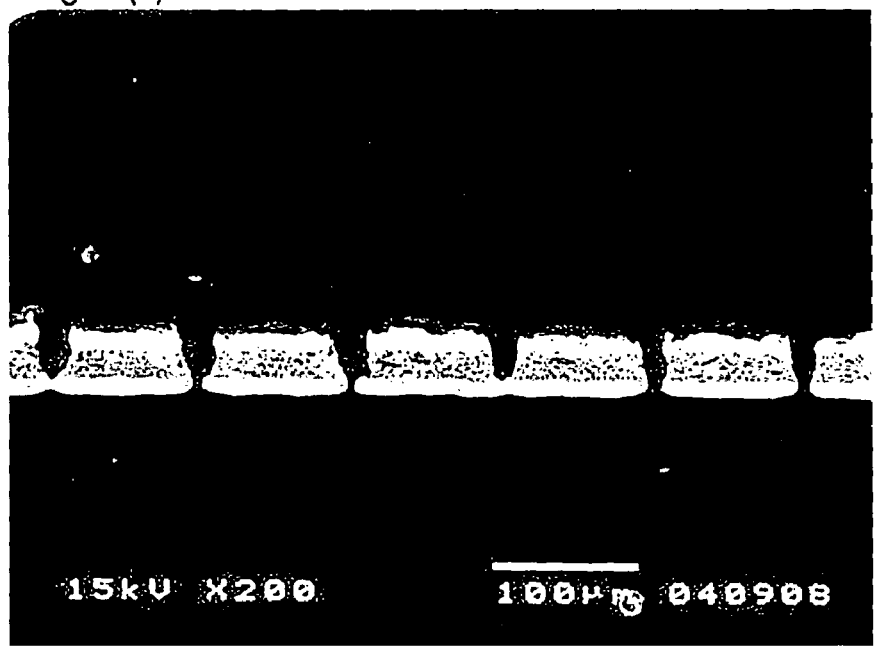
Fig.11(d) Enlarged cross sectional view
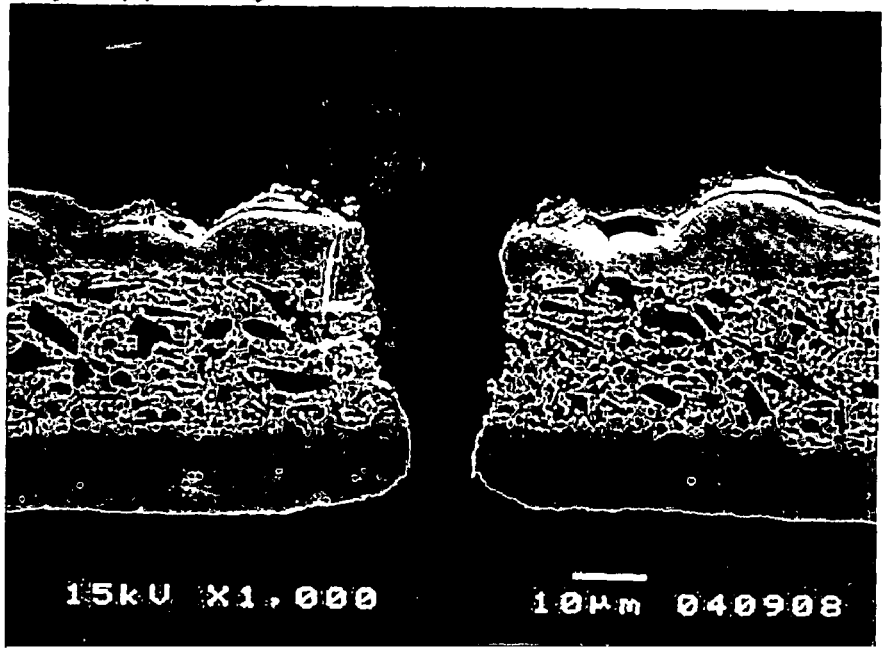

NEGATIVE ELECTRODE FOR NONAQUEOUS SECONDARY BATTERY

TECHNICAL FIELD

The present invention relates to a negative electrode for nonaqueous secondary batteries including lithium ion secondary batteries.

BACKGROUND ART

JP-A-8-50922 proposes a negative electrode for a lithium secondary battery containing, as constituent components, a metal element that forms an alloy with lithium and a metal element that does not form an alloy with lithium, in which the content of the metal element that does not form an alloy with lithium is higher in the surface portion that is to come into contact with an electrolyte and to face the positive electrode and in the portion that leads to an output terminal. The publication alleges that electroconductivity is maintained via the metal that does not form a lithium alloy even though the metal that forms a lithium alloy pulverizes due to charge/discharge cycling.

The embodiments suggested in JP-A-8-50922 include a structure composed of a current collecting member made of a metal that does not form a lithium alloy and a member made of powder containing a metal element that forms a lithium alloy, in which the latter member is adhered to the former member with a binder. The structure may be fired. It is also suggested to dispose a metal element that does not form a lithium alloy on the layer containing a metal that forms a lithium alloy. The metal element that does not form a lithium alloy is provided by, for example, plating.

However, the negative electrode of JP-A-8-50922 fails to be covered with the metal incapable of forming a lithium alloy at a sufficient coverage and to have sufficient strength because the layer of the metal incapable of forming a lithium alloy is very thin as about 50 nm in thickness. As a result, the negative electrode is incapable of sufficiently accommodating the stress created by volumetric change of the active material due to expansion and contraction accompanying alternate charging and discharging. Noticeable deformation of the negative electrode will thus result. When the active material pulverizes through expansion and contraction, the negative electrode is incapable of effectively preventing the active material from falling off. Therefore, it is still difficult with this technique to provide a negative electrode with improved cycle characteristics.

Apart from JP-A-8-50922, a negative electrode for nonaqueous secondary batteries in which an active material layer has through-holes has been proposed (see JP-A-2001-76761). In a case when the active material pulverizes through its expansion and contraction, however, the proposed negative electrode has difficulty in maintaining electroconductivity and preventing the active material from falling off the side wall of the through-holes. Therefore, it is not easy to obtain improved cycle characteristics with that structure.

DISCLOSURE OF THE INVENTION

An object of the present invention is to provide a negative electrode for a nonaqueous secondary battery that is freed of various disadvantages associated with the aforementioned related art.

The present invention accomplishes the above object by providing a negative electrode for a nonaqueous secondary battery having an active material layer containing particles of an active material, the active material layer having a metallic material deposited among the particles by electroplating, and the negative electrode having a large number of holes open on at least one side thereof and extending through the thickness of the active material layer.

The present invention also provides a nonaqueous secondary battery having the above-described negative electrode.

BRIEF DESCRIPTION OF THE DRAWINGS

FIG. 2(a), FIG. 2(b), FIG. 2(c), FIG. 2(d), FIG. 2(e), FIG. 2(f), and FIG. 2(g) show steps included in a process for producing the negative electrode of FIG. 1.

FIG. 3 schematically illustrates a current collecting layer with micropores being formed.

FIG. 8(a), FIG. 8(b), FIG. 8(c), FIG. 8(d), and FIG. 8(e) show steps included in a process for producing the negative electrode of FIG. 7.

FIG. 10(a), FIG. 10(b), FIG. 10(c), and FIG. 10(d) present photographs showing the appearances of the negative electrode obtained in Example 1 before use and after the first cycle.

FIG. 11(a), FIG. 11(b), FIG. 11(c), and FIG. 11(d) present scanning electron micrographs showing the surfaces and a cross section of the negative electrode obtained in Example 1.

BEST MODE FOR CARRYING OUT THE INVENTION

Figure 1:
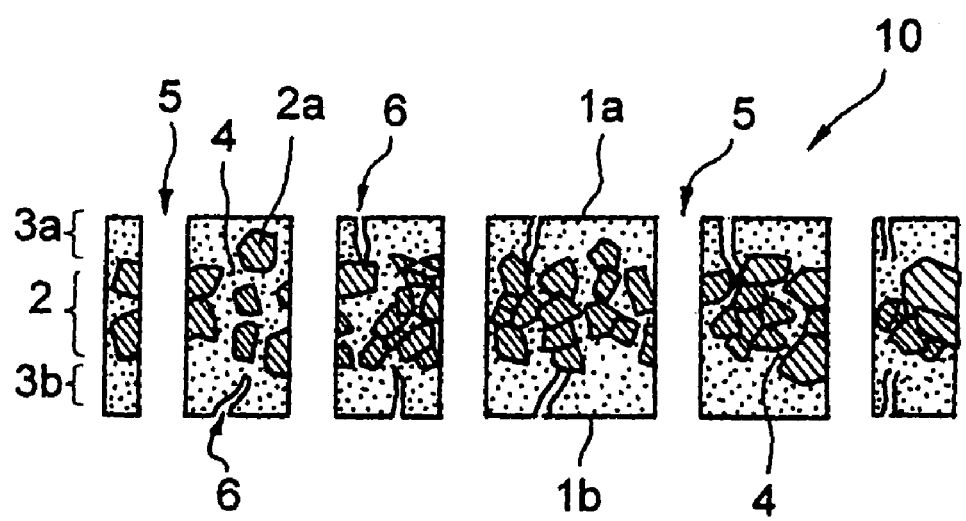
FIG. 1 is a schematic cross-section of a first embodiment of the negative electrode according to the present invention.

The present invention will be described based on its preferred embodiments with reference to the accompanying drawings. The description starts with the negative electrode of a first embodiment shown in FIG. 1. The negative electrode 10 of this embodiment has a first surface 1a and a second surface 1b both adapted to be brought into contact with an electrolyte. The electrode 10 has an active material layer 2. The active material layer 2 is continuously covered with a pair of current collecting layers 3a and 3b on both sides thereof. The current collecting layers 3a and 3b include the first surface 1a and the second surface 1b, respectively. As is clearly understood from FIG. 1, the electrode 10 does not have a thick conductor for current collection, which is called a current collector and has hitherto been used in negative electrodes, such as a metal foil or expanded metal with a thickness of about 12 to 35 μm.

The current collecting layers 3a and 3b perform current collecting function in the negative electrode 10 of the present embodiment. The current collecting layers 3a and 3b also serve to prevent the active material of the active material layer 2 from falling off as a result of pulverization due to volumetric changes accompanying charge and discharge cycling.

Each of the current collecting layers 3a and 3b is thinner than the thick conductor film that has been used for current collection in conventional electrodes. Specifically, it is preferably as thin as about 0.3 to 10 μm, still preferably about 0.4 to 8 μm, particularly preferably about 0.5 to 5 μm. With this minimum thickness, the active material layer 2 can be covered substantially completely and continuously. The active material that has pulverized can thus be prevented from falling off. With this small thinness of the current collecting layers and without a thick conductor for current collection, the negative electrode is allowed to have a relatively increased proportion of the active material and thereby exhibits an increased energy density per unit volume and unit weight. Conventional electrodes have a limit in increasing energy density because of the relatively large proportion of its thick, current-collecting conductor. The current collecting layers 3a and 3b having a thickness within the recited range are preferably formed by electroplating. The two current collecting layers 3a and 3b may be the same or different in thickness.

As mentioned, the two current collecting layers 3a and 3b are inclusive of the first surface 1a and the second surface 1b, respectively. The first surface 1a and the second surface 1b are to be in contact with an electrolyte when the electrode 10 of the present embodiment is assembled into a battery. On the other hand, a thick, current-collecting conductor used in a conventional electrode has no surface in contact with an electrolyte where it has an active material layer on its both sides or only one surface in contact with an electrolyte where it has an active material layer on one side thereof. In other words, in the absence of a thick, current-collecting conductor that has been used in conventional electrodes, the outermost layers of the electrode 10, namely the current collecting layers 3a and 3b bear the current collecting function combined with a function for preventing fall-off of the pulverized active material.

Since the current collecting layers 3a and 3b having the first surface 1a and the second surface 1b, respectively, both have current collecting function, there is an advantage that a battery using the negative electrode 10 of the present embodiment can be designed to have a lead wire connected to whichever current collecting layer 3a or 3b is appropriate.

The current collecting layers 3a and 3b are made of a metal capable of functioning as a current collector of a nonaqueous secondary battery, preferably a metal capable of functioning as a current collector of a lithium secondary battery. Such a metal includes those having low capability of forming a lithium compound, such as copper, nickel, iron, cobalt, and alloys of these metals. Of these metals preferred are copper, nickel, and their alloys. In particular, a nickel-tungsten alloy is preferred for enhancing the strength of the current collecting layers 3a and 3b. The two current collecting layers 3a and 3b can be made of the same or different materials. The expression "low capability of forming a lithium compound" as used herein means no capability of forming an intermetallic compound or solid solution with lithium or, if any, the capability is such that the resulting lithium compound is a very small amount or is very labile.

The active material layer 2 positioned between the current collecting layers 3a and 3b contains particles 2a of an active material. The active material layer 2 is formed by, for example, applying an electro-conductive slurry containing the active material particles 2a.

The active material includes silicon materials, tin materials, aluminum materials, and germanium materials, with silicon materials being preferred. The active material layer 2 being covered with the current collecting layers 3a and 3b, the active material having pulverized through charge/discharge cycles is effectively prevented from falling off. By virtue of the presence of holes hereinafter described, the active material particles 2a can meet the electrolyte, they are not hindered from electrode reaction.

The active material particles 2a preferably have a maximum particle size of 30 μm or smaller, still preferably 10 μm or smaller. The particle size, represented in terms of $D_{50}$ value, of the particles is preferably 0.1 to 8 μm, still preferably 0.3 to 2 μm. Where the maximum particle size exceeds 30 μm, the particles are liable to fall off, resulting in reduction of electrode life. The lower limit of the particle size is not particularly specified. Smaller is better. In the light of the process of making the particles, the lower limit would be about 0.01 μm. The particle size of the particles can be measured with a particle size distribution measuring device using a laser diffraction scattering method, or under electron microscopic (SEM) observation.

There is a tendency that too small a proportion of the active material in the negative electrode makes it difficult to sufficiently improve battery energy density. On the other hand, the active material, if used too much, tends to fall off. Taking these tendencies into consideration, the amount of the active material is preferably 5% to 80% by weight, still preferably 10% to 50% by weight, particularly preferably 20% to 50% by weight, based on the total weight of the negative electrode.

The thickness of the active material layer 2 is subject to adjustment in accordance with the proportion of the active material to the whole negative electrode and the particle size of the active material. While not critical in the present embodiment, it is usually about 1 to 100 μm, preferably about 3 to 60 μm. As described later, the active material layer is preferably formed by applying an electro-conductive slurry containing active material particles.

As shown in FIG. 1, the active material layer 2 has a metallic material 4 having low capability of forming a lithium compound penetrating among the particles present in the layer. The metallic material 4 is deposited among the particles by electroplating. It is preferred that the active material layer 2 be penetrated with the metallic material 4 throughout its whole thickness and that the active material particles 2a be present in the penetrating material. That is, it is preferred that the active material particles 2a be not substantially exposed on the surfaces of the negative electrode 10 and be embedded in the inner side of the current collecting layers 3a and 3b. In that preferred state, the active material layer 2 and the current collecting layers 3a and 3b are firmly united, and fall-off of the active material is prevented more effectively. Furthermore, because the material 4 penetrating in the active material layer 2 secures electron conductivity between the current collecting layers 3a and 3b and the active material, the active material is effectively prevented from being electrically isolated in parts, especially in the depth of the active material layer 2. The current collecting function is thus maintained. As a result, reduction in function as a negative electrode is suppressed, and the life of the negative electrode is prolonged. This is particularly advantageous in using, as an active material, a material that is semiconductive and poor in electron conductivity, such as a silicon material.

The metallic material 4 with low capability of forming a lithium compound that penetrates the active material layer 2 has electroconductivity. Examples of the metallic material 4 include copper, nickel, iron, cobalt, and alloys of these metals. The material 4 may be the same or different from the material making up the current collecting layers 3a and 3b.

It is preferred that the metallic material 4 having low capability of forming a lithium compound penetrate the whole thickness of the active material layer 2 so that the two current collecting layers 3a and 3b may be electrically connected via the penetrating metallic material 4, thereby to further enhance the electron conductivity of the whole negative electrode 10. That is, the negative electrode 10 of the present embodiment performs the current collecting function as a whole. The fact that the metallic material 4, having low capability of forming a lithium compound, penetrates the whole thickness of the active material layer 2 can be confirmed by mapping the material using an electron microscope. A preferred method for penetrating the metallic material having low capability of forming a lithium compound into the active material layer 2 will be described later.

It is preferred that the metallic material 4 having low capability of forming a lithium compound not completely fill the interstitial spaces between the active material particles 2a, but leave vacant spaces. The vacant spaces serve to relax the stress caused by volumetric changes of the active material particles 2a accompanying charge and discharge cycles. In this connection, the proportion of the vacant spaces in the active material layer 2 is preferably about 0.1% to 30% by volume, still preferably about 0.5% to 5% by volume. The proportion of the vacant spaces can be determined by electron microscope mapping. Seeing that the active material layer 2 is formed by applying an electro-conductive slurry containing the active material particles 2a, followed by drying, vacant spaces are necessarily formed in the active material layer 2. Accordingly, the volume proportion of the vacant spaces can be controlled within the recited range by properly selecting the particle size of the active material particles 2a, the composition of the electro-conductive slurry, and the conditions of application. The volume proportion of the vacant spaces may also be adjusted by pressing the dried active material layer 2 under proper conditions. It should be noted that the vacant spaces differ from the holes 5 described infra.

The active material layer may contain an electro-conductive carbon material in addition to the active material particles 2a to give further improved electron conductivity to the negative electrode 10. From this viewpoint, the amount of the electro-conductive carbon material particles is preferably 0.1% to 20% by weight, still preferably 1% to 10% by weight, based on the weight of the active material layer 2. The electro-conductive carbon material includes acetylene black and graphite. To ensure the improvement on electron conductivity, it is preferred for the electro-conductive particles to have a particle size of 40 μm or smaller, still preferably 20 μm or smaller. The lower limit of the particle size is not critical, which means that smaller is better. In the light of the process of making the particles, the lower limit would be about 0.01 μm.

As shown in FIG. 1, the negative electrode 10 has a large number of holes 5 that are open on both sides thereof and extend through the thicknesses of the active material layer 2 and the current collecting layers 3a and 3b. The holes 5 go through the thickness of the negative electrode 10. The active material layer 2 is exposed on the inner wall of the holes 5. The holes 5 perform the following two main functions.

One of the functions is to supply the electrolyte to the inside of the active material layer 2 through the surface of the active material layer 2 exposed on the inner wall of the holes 5. Although the active material layer 2 is exposed on the inner wall of the holes 5, the active material particles 2a are prevented from falling off since the metallic material 4 has penetrated among the particles 2a of the active material layer.

The other is to relax the stress resulting from volumetric changes of the active material particles 2a in the active material layer accompanying charge and discharge cycles. The stress arising from the volumetric changes develops chiefly in the planar direction of the negative electrode 10. Therefore, an increase in volume of the active material particles 2a during charging is absorbed by the vacancy of the holes 5. As a result, pronounced deformation of the negative electrode 10 is effectively prevented.

The holes 5 additionally serve to externally release gas generated in the negative electrode. In some detail, gases such as $H_2$, CO, and $CO_2$ can be generated by the action of a trace amount of water present in the negative electrode. Accumulation of these gases in the negative electrode results in greater polarization to cause charge/discharge losses. The holes 5 let the gases out of the negative electrode and thereby minimize the polarization due to the gases. The holes 5 still additionally serve for heat dissipation of the negative electrode. In more detail, the holes 5 bring about an increased specific surface area of the negative electrode so that the heat generated with lithium intercalation is efficiently released out of the negative electrode. Furthermore, the stress due to the volumetric change of the active material particles 2a can cause heat generation. The stress relaxation by the holes 5 is effective in suppressing heat generation per se.

To assure sufficient supply of the electrolyte into the active material layer and to achieve effective relaxation of the stress due to the volumetric change of the active material particles 2a, the open area ratio of the holes 5 open on a surface of the negative electrode 10, that is, the percentage of the total area of the holes 5 to the apparent area of the surface is preferably 0.3% to 30%, still preferably 2% to 15%. From the same viewpoint, the holes 5 open on a surface of the negative electrode 10 preferably has an opening diameter of 5 to 500 μm, still preferably 20 to 100 μm. The pitch of the holes 5 is preferably set at 20 to 600 μm, still preferably 45 to 400 μm, which is effective in assuring sufficient supply of the electrolyte into the active material layer and achieving effective relaxation of the stress due to the volumetric change of the active material particles 2a. The average number of the holes 5 per arbitrary 1 cm-side square visual field on a surface of the negative electrode 10 is preferably 100 to 250,000, still preferably 1,000 to 40,000, particularly preferably 5,000 to 20,000.

The individual holes go through the thickness of the negative electrode 10. Nevertheless, considering that the functions of the holes 5 are to supply sufficient electrolyte into the active material layer and to relax the stress arising from the volumetric change of the active material particles 2a, the holes 5 do not have to go through the thickness of the negative electrode 10. It suffices that the holes 5 are open on a surface of the negative electrode 10 and reach at least the active material layer 2.

It is desirable that the current collecting layers 3a and 3b of the electrode 10 each have a large number of micropores 6 open on the first surface 1a and the second surface 1b, respectively, and leading to the active material layer 2 as illustrated in FIG. 1. It should be noted that the micropores 6 are different from the vacant spaces formed in the active material layer 2. The micropores 6 are formed in each of the current collecting layers 3a and 3b, extending in the layers 3a and 3b in their thickness direction. The micropores 6 allow an electrolyte to penetrate therethrough. The micropores 6 are finer than the holes 5 described supra. The role of the micropores 6 is to assist the role of the holes 5 in sufficiently supplying the electrolyte into the active material layer. Therefore, the structure with the micropores 6 is not essential in the present invention.

In a cross-section of the current collecting layers 3a and 3b, the micropores 6 are very fine, having a width of about 0.1 μm to about 10 μm. The micropores 6 are so fine and yet wide enough to allow penetration of an electrolyte. In fact, a nonaqueous electrolyte, which has a smaller surface tension than an aqueous one, is capable of penetrating through the micropores 6 with such a small width. The micropores 6 are preferably formed simultaneously, with formation of the current collecting layers 3a and 3b by electroplating.

When seen from above under an electron microscope, the micropores 6 on at least one of the first surface 1a and the second surface 1b, preferably have an average open area of about 0.1 to 50 $\mu m^2$, still preferably about 0.1 to 20 $\mu m^2$, particularly preferably about 0.5 to 10 $\mu m^2$. The average open area in that range assures sufficient penetration of an electrolyte while effectively preventing fall-off of the active material. That range also increases the charge and discharge capacities from the initial stage of charge/discharge cycling.

When the first surface 1a and/or second surface 1b having the micropores 6 of which the average open area falls within the above-recited range is/are observed under an electron microscope, the ratio of the total open area of the micropores 6 in the visual field to the area of the visual field (i.e., the open area ratio) is preferably 0.1% to 20%, still preferably 0.5% to 10%. The reason for this is the same as for specifying the range of the open area of the individual micropores 6. For the same reason, it is preferable that the first surface 1a and/or second surface 1b having the micropores 6 of which the average open area falls within the above-recited range have 1 to 20,000, more preferably 10 to 1,000, even more preferably 30 to 500, micropores 6 in every 100 $\mu m$-side square in the visual field under an electron microscope. The number of the micropores 6 as defined above is referred to as a distribution.

A preferred process for producing the negative electrode 10 according to the present embodiment will be described by referring to FIG. 2. The process includes the steps of forming a current collecting layer 3b by electroplating, forming an active material layer 2 on the current collecting layer 3b, forming a current collecting layer 3a on the active material layer 2, and finally forming holes 5. The process starts with preparation of a carrier foil 11 shown in FIG. 2(a). The carrier foil 11 is used as a support for making a negative electrode 10. The carrier foil 11 continues supporting the produced negative electrode 10 until use or during assembly into a battery to secure ease in handling. Taking these roles into consideration, it is desirable for the carrier foil 11 to have such strength not to wrinkle or twist during production of the negative electrode 10, transportation after the production, and assembly into a battery. From this viewpoint, the carrier foil 11 preferably has a thickness of about 10 to 50 $\mu m$. Seeing that the primary role of the carrier foil 11 is to serve as a support in the production of the negative electrode 10, production of the electrode 10 does not always require use of the carrier foil, where the current collecting layer 3b is strong enough.

The carrier foil 11 is preferably electro-conductive. The carrier foil 11 does not need to be made of metal as long as it is electro-conductive. Nevertheless, use of a metal-made foil as the carrier foil 11 is advantageous, in that the carrier foil 11 left after making a negative electrode 10 can be melted and recycled into foil. In using a metal-made carrier foil 11, it is preferred to use a carrier foil 11 containing at least one metal selected from Cu, Ni, Co, Fe, Cr, Sn, Zn, In, Ag, Au, Al, and Ti.

Any foil prepared by various methods, such as rolled foil or electrolytic foil, can be used as the carrier foil 11 with no restriction. It is preferred that the surface of the carrier foil 11 have some roughness so that the current collecting layer 3b formed thereon may have a controlled micropore size and density. Rolled foil has a smooth surface on both sides thereof in nature of the process, whereas electrolytic foil has a rough surface on one side and a smooth surface on the other side.

The rough surface is the metal-deposited side in electrolysis. So, the rough surface of an electrolytic foil can be made use of as the surface on which the current collecting layer 3b is to be formed, which is more convenient than using a carrier foil with its surface rendered rough by any surface treatment. The advantages attributed to the use of a rough surface will be described later. The rough surface on which the current collecting layer 3b is formed preferably has a surface roughness Ra (JIS B0601) of 0.05 to 5 $\mu m$, still preferably 0.2 to 0.8 $\mu m$, in order to facilitate forming micropores of desired diameter and density.

One surface, preferably the rough surface, of the carrier foil 11 is made releasable by applying a release agent. The release agent is provided for the purpose of successfully separating a negative electrode 10 from the carrier foil 11 in the step of peeling described infra. Organic compounds, particularly nitrogen-containing compounds or sulfur-containing compounds, are preferably used as a release agent. The nitrogen-containing compounds preferably include triazole compounds, such as benzotriazole (BTA), carboxybenzotriazole (CBTA), tolyltriazole (TTA), N',N'-bis(benzotriazolylmethyl)urea (BTD-U), and 3-amino-1H-1,2,4-triazole (ATA). The sulfur-containing compounds include mercaptobenzothiazole (MBT), thiocyanuric acid (TCA), and 2-benzimidazolethiol (BIT). These organic compounds are dissolved in an alcohol, water, an acidic solvent, an alkaline solvent, etc. The concentration of the solution of, for example, CBTA is preferably 2 to 5 g/l. The peelability can be controlled by the concentration and the applied amount of the release agent solution. Forming an inorganic release layer of chromium or lead or a chromate treatment layer in place of the organic compound release layer is also effective. The purpose of applying a release agent is just to facilitate peeling a formed negative electrode 10 off the carrier foil 11. Therefore, a current collecting layer 3b with a large number of micropores can be formed even if the step of applying a release agent is omitted.

A coating solution containing an electro-conductive polymer is applied to a release agent layer (not shown) and dried to form a polymer film 12 as shown in FIG. 2(b). The coating solution applied to the rough surface of the carrier foil 11 is liable to pool in the depressions of the rough surface. Therefore, evaporation of the solvent results in formation of a polymer film 12 with a non-uniform thickness. That is, the polymer film 12 has thicker parts corresponding to the depressions and thinner parts corresponding to the projections of the rough surface. The process is characterized in that the non-uniformity in thickness of the polymer film 12 is taken advantage of to form a large number of micropores in the current collecting layer 3b.

Conventionally known electro-conductive polymers can be used with no particular restriction. Examples of useful conductive polymers are polyvinylidene fluoride (PVDF), polyethylene oxide (PEO), polyacrylonitrile (PAN), and polymethyl methacrylate (PMMA). Lithium ion conducting polymers are preferred. The electro-conductive polymers are preferably fluorine-containing ones; for fluorine-containing polymers are stable against heat and chemicals and mechanically strong. From all these considerations, polyvinylidene fluoride, which is a fluorine-containing polymer having lithium ion conductivity, is the most preferred.

The coating solution of the electro-conductive polymer is a solution of the electro-conductive polymer in a volatile organic solvent. For example, N-methylpyrrolidone is suitable for polyvinylidene fluoride.

It is believed that a large number of micropores are formed in the current collecting layer 3b by the following mechanism. The carrier foil 11 coated with the polymer film 12 is electroplated to form the current collecting layer 3b as shown in FIG. 2(c). FIG. 3 schematically represents an enlargement of FIG. 2(c). The electro-conductive polymer film 12 is electron-conductive anyhow, while not so conductive as metal. The electron conductivity of the polymer film 12 varies with thickness. Therefore, metal being deposited on the polymer film 12 shows variations in deposition rate in accordance with the variations in polymer film thickness. The variations in deposition rate result in formation of micropores 6 in the current collecting layer 3b. The site of the current collecting layer 3b that corresponds to the thicker part of the polymer film 12, where the deposition rate is low, tends to become a micropore 6. As previously stated, the formation of micropores in the current collecting layer is not essential in the present invention. The step of applying a coating solution containing an electro-conductive polymer is unnecessary where micropores are not formed in the current collecting layer.

The diameter and density of the micropores 6 are controllable by not only the surface roughness Ra of the carrier foil 11, as mentioned above, but also the concentration of the electro-conductive polymer in the coating solution. For instance, a lower electro-conductive polymer concentration tends to result in a smaller micropore diameter and a smaller micropore density. Conversely, a higher electro-conductive polymer concentration tends to result in a larger diameter. From this point of view, a preferred electro-conductive polymer concentration in the coating solution is 0.05% to 5% by weight, still preferably 1% to 3% by weight.

The plating bath composition and other plating conditions for forming the current collecting layer 3b are decided appropriately according to the material of the current collecting layer 3b. Plating baths for making a current collecting layer 3b of copper include a copper sulfate bath having the composition below and a copper pyrophosphate bath.

| | |
|---|---|
| $CuSO_4 \cdot 5H_2O$ | 150 to 350 g/l |
| $H_2SO_4$ | 50 to 250 g/l |

A preferred bath temperature is about 40° to 70° C., and a preferred current density is about 0.5 to 50 A/dm².

The release agent layer and the electro-conductive polymer layer that are made up of organic substances can also be formed by dipping.

An electro-conductive slurry containing active material particles is applied to the current collecting layer 3b to form an active material layer 2 as shown in FIG. 2(d). The slurry contains particles of an electro-conductive carbon material, a binder, a diluting solvent and so forth, in addition to the active material particles. The active material particles and the electro-conductive carbon material particles are as described supra. Useful binders include polyvinylidene fluoride (PVDF), polyethylene (PE), ethylene-propylene-diene monomer (EPDM) and styrene-butadiene rubber (SBR). Useful diluting solvents include N-methylpyrrolidone and cyclohexane. The amount of the active material particles in the slurry is preferably about 14% to 40% by weight. The amount of the electro-conductive carbon material is preferably about 0.4% to 4% by weight. The amount of the binder is preferably about 0.4% to 4% by weight. The slurry is prepared by adding a diluting solvent to a mix of these components.

The coating layer of the slurry is dried to form an active material layer 2. The active material layer 2 thus formed has numerous fine interstitial spaces between the particles. The carrier foil 11, with the active material layer 2, is immersed in a plating bath containing a metallic material having low capability of forming a lithium compound to conduct electroplating. Upon putting the active material layer 2 in the plating bath, the plating solution penetrates into the interstitial spaces and reaches the interface between the active material layer 2 and the current collecting layer 3b. In this state, electroplating is performed. This mode of plating will also be referred to as penetration plating. As a result, the metallic material having low capability of forming a lithium compound is deposited in (a) the inside of the active material layer 2 and (b) the inner surface side of the active material layer 2 (i.e., the side facing the current collecting layer 3b). The metallic material is thus distributed throughout the thickness of the active material layer 2.

The conditions of the penetration plating are of importance in order to deposit the metallic material, having low capability of forming a lithium compound, in the active material layer 2. The following is recommended conditions taking copper, for instance, as a metallic material having low capability of forming a lithium compound. In using a copper sulfate-based solution, electroplating is performed at a copper concentration of 30 to 100 g/l, a sulfuric acid concentration of 50 to 200 g/l, a chlorine concentration of 30 ppm or less, a bath temperature of 30° to 80° C., and a current density of 1 to 100 A/dm². In using a copper pyrophosphate-based solution, electroplating is conducted at a copper concentration of 2 to 50 g/l, a potassium pyrophosphate concentration of 100 to 700 g/l, a bath temperature of 30° to 60° C., a pH of 8 to 12, and a current density of 1 to 10 A/dm². By controlling these electrolysis conditions properly, the metallic material having low capability of forming a lithium compound is deposited over the whole thickness of the active material layer 2. The current density in electrolysis is a particularly important condition. At too high a current density, deposition occurs only on the exterior surface but not inside of the active material layer 2.

A current collecting layer 3a is then formed on the active material layer 2. Containing active material particles 2a, the active material layer 2 has a rough surface. Therefore, it is possible to form a great number of micropores 6 in the current collecting layer 3a, too, by adopting the same means as used to form the current collecting layer 3b on the rough surface of the carrier foil 11, an electrolytic foil. That is, a coating solution containing an electro-conductive polymer is applied to the surface of the active material layer 2 and dried to form a polymer film. A current collecting layer 3a is formed on the polymer film, as shown in FIG. 2(e), by electroplating under the same conditions as in the formation of the current collecting layer 3b. As stated above, formation of micropores in the current collecting layer is not essential in the present invention, the step of applying a coating solution containing an electro-conductive polymer is unnecessary where formation of micropores in the current collecting layer is not desired.

Holes 5 are then perforated through the current collecting layers 3a and 3b and the active material layer 2 by prescribed perforating means as shown in FIG. 2(f). The manner of perforating the holes 5 is not limited. For example, the holes 5 can be bored by laser machining or mechanical means such as needles or a perforating punch. Laser machining provides an advantage over the mechanical means, in that a negative electrode, having satisfactory cycle characteristics and charge/discharge efficiency, is obtained easily. The advantage is attributed to the fact that the metallic material, melted and resolidified by laser machining, covers the surface of the active material particles existing on the inner wall of the holes 5 to protect the particles from being exposed, which prevents the active material from falling off the inner wall of the holes 5. The holes 5 may also be made by sandblasting or by making use of photoresist technology. It is preferred that the holes 5 be formed at an almost regular interval so that electrode reaction may occur uniformly throughout the negative electrode.

Finally, the carrier foil 11 is peeled apart from the current collecting surface layer 3b to give a desired negative electrode 10 as shown in FIG. 2(g). Although FIG. 2(g) shows that the polymer film 12 remains on the side of the current collecting layer 3b, whether the polymer film 12 actually remains on the side of the carrier foil 11 or the current collecting layer 3b depends on the thickness or the material of the polymer film 12. The polymer film 12 can remain on both the carrier foil 11 and the current collecting layer 3b. As previously stated, the negative electrode 10 may be stored as supported on the carrier foil 11 until use.

The thus obtained negative electrode, according to the present embodiment of the invention, is assembled into a nonaqueous secondary battery together with a known positive electrode, separator and nonaqueous electrolyte. A positive electrode is produced as follows. A positive electrode active material and, if necessary, an electro-conductive material and a binder are suspended in an appropriate solvent to prepare a positive electrode active material mixture, which is applied to a current collector, dried, rolled, and pressed, followed by cutting and punching. Conventionally known positive electrode active materials can be used, including lithium-nickel composite oxide, lithium-manganese composite oxide and lithium-cobalt composite oxide. Preferred separators include nonwoven fabric of synthetic resins and a porous film of polyethylene or polypropylene. The nonaqueous electrolyte used in a lithium secondary battery, for instance, is a solution of a lithium salt, a supporting electrolyte, in an organic solvent. The lithium salt includes $LiClO_4$, $LiAlCl_4$, $LiPF_6$, $LiAsF_6$, $LiSbF_6$, $LiSCN$, $LiCl$, $LiBr$, $LiI$, $LiCF_3SO_3$, and $LiC_4F_9SO_3$.

Figure 4:
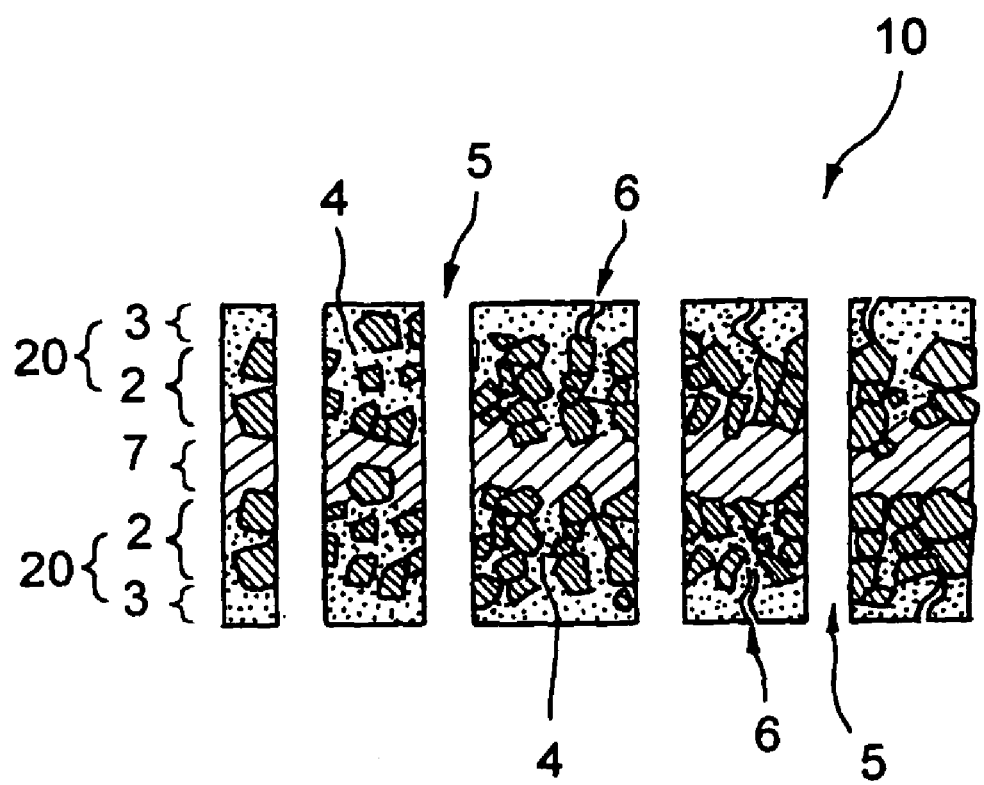
FIG. 4 is a schematic cross-section of a second embodiment of the negative electrode according to the present invention.

A second embodiment of the present invention is described by referring to FIG. 4. With respect to the particulars of the second embodiment that are not referred to hereunder, the description relating to the first embodiment shall be applied appropriately. The members in FIG. 4 that are the same as in FIGS. 1 to 3 are given the same numerical references as in FIGS. 1 to 3.

The negative electrode 10 according to the second embodiment has, as basic constituent members, two negative electrode precursors 20 and a metallic lithium layer 7. The metallic lithium layer 7 is held in between the negative electrode precursors 20.

The negative electrode precursors 20 each have a current collecting layer 3 and an active material layer 2 disposed on one side of the current collecting layer 3. As shown in FIG. 4, the two negative electrode precursors 20 are paired with their active material layers 2 facing each other, while the current collecting layers 3 facing outward and the metallic lithium layer 7 is sandwiched therebetween.

The metallic lithium layer 7, interposed between two active material layers 2, makes up a local cell with the active material (negative electrode active material) in the presence of a nonaqueous electrolyte. It follows that metallic lithium from the metallic lithium layer 7 chemically reacts with the nearby active material to form a lithium compound. Otherwise, lithium reacts with the active material as a result of lithium concentration gradient, thereby to form a lithium compound. In this way, the metallic lithium layer 7 acts as a lithium supply source. As a result, even though lithium is consumed through reaction with the electrolyte with charge and discharge cycles or during long term storage, lithium is supplied from the lithium compound. This eliminates what we call the lithium depletion problem. The cycle characteristics of the negative electrode 10 can thus be improved. Moreover, since the metallic lithium layer 7 is not exposed on the surface but buried inside the negative electrode 10, and lithium is to react with the active material to form a lithium compound, there is no fear that lithium grows dendritically and can cause an internal shortage or ignition. After lithium reacts, there is left a lithium compound, an expanded reaction product between lithium and the active material, in the metallic lithium layer 7.

It is particularly worth noting that the reaction between metallic lithium and the active material takes place without charging the negative electrode 10 as assembled into a battery. This phenomenon was first discovered by the present inventors. As a result of the reaction between the metallic lithium and the active material before assembly into a battery, the active material has increased in volume prior to assembly into a battery. Accordingly, when the negative electrode 10 is assembled into a battery and subjected to charge/discharge cycles, the rate of expansion of the negative electrode 10, due to charge/discharge cycling, is extremely small. The negative electrode 10 of the second embodiment brings about a greatly advantageous effect, in that it undergoes little deformation due to volumetric change of the active material with charge and discharge cycles.

For obtaining satisfactory capability of restoring the capacity, the amount of the metallic lithium is preferably 0.1% to 70%, still preferably 5% to 30%, of the saturated reversible capacity of the active material.

Figure 5A:
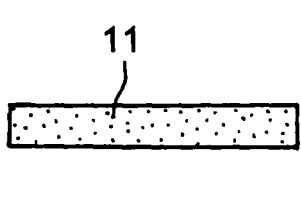
FIG. 5(a), FIG. 5(b), FIG. 5(c), FIG. 5(d), FIG. 5(e), FIG. 5(f), FIG. 5(g), and FIG. 5(h) show steps included in a process for producing the negative electrode of FIG. 4.
Figure 5B:
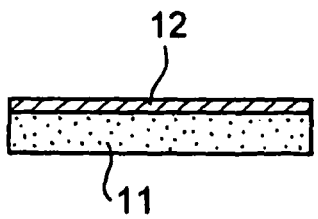
Figure 5C:
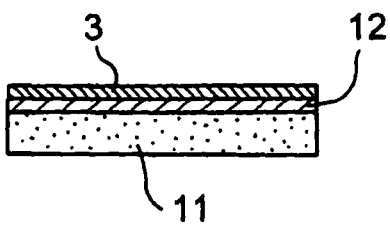
Figure 5D:
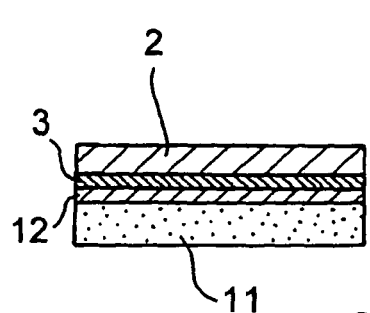

A preferred process for producing the negative electrode 10 shown in FIG. 4, will be described by referring to FIG. 5. The description related to the aforementioned process shown in FIGS. 2 and 3, appropriately applies to those particulars of the present process that are not explained here. Negative electrode precursors 20 are the first to be made. To make the negative electrode precursor 20, a carrier foil 11 is prepared as shown in FIG. 5(a). If necessary, a release agent is applied to one side of the carrier foil 11. A coating solution containing an electro-conductive polymer is applied thereon and dried to form a polymer film 12 as shown in FIG. 5(b). A material of a current collecting layer 3 is deposited on the polymer film 12 by electroplating to form a current collecting layer 3 as shown in FIG. 5(c). An electro-conductive slurry containing active material particles is applied to the current collecting layer 3 to form an active material layer 2 as shown in FIG. 5(d). After the coating layer of the slurry dries to form an active material layer 2, the carrier foil 11 having the active material layer 2 is immersed in a plating bath containing a metallic material having low capability of forming a lithium compound to carry out penetration plating.

Figure 5E:
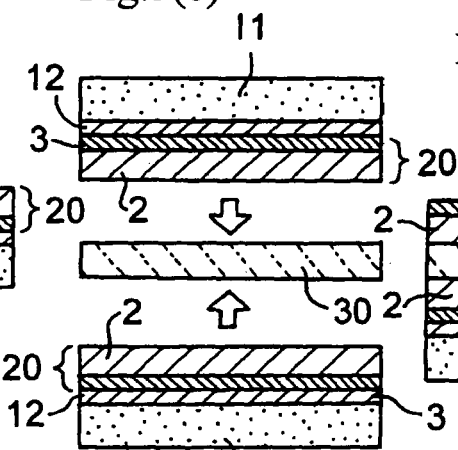
Figure 5F:
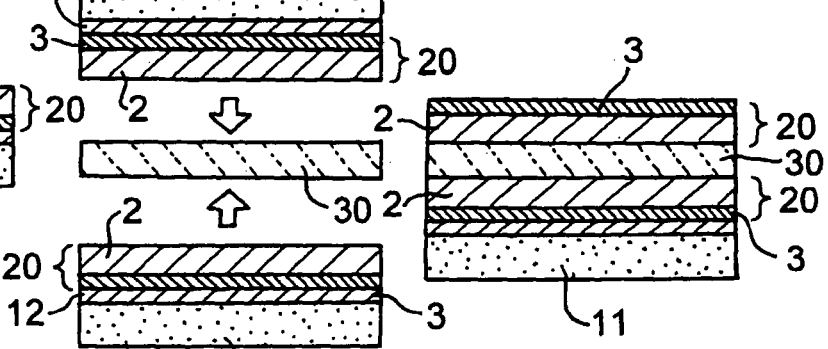
Figure 5G:
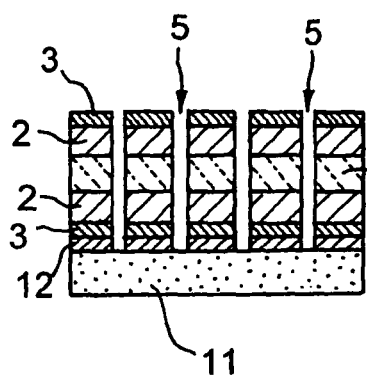
Figure 5H:
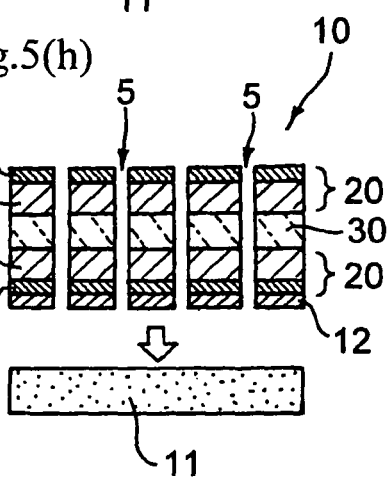

In this way, there is obtained a negative electrode precursor 20 having the current collecting layer 3 and the active material layer 2 formed in this order on the carrier foil 11. Two negative electrode precursors 20 thus obtained are used as paired members. As illustrated in FIG. 5(e), the negative electrode precursors 20 are paired with their active material layers 2 facing each other, a metallic lithium foil 30 is inserted therebetween, and the metallic lithium foil 30 and the paired negative electrode precursors 20 are united together. The metallic lithium foil 30 and the paired negative electrode precursors 20 can be united merely by superposing them one on top of another and pressing. Where enhanced interlaminar strength is desired, the three members may be united using an electro-conductive adhesive such as electro-conductive paste. The carrier foil may be removed before the paired negative electrode precursors 20 are united.

One of the carrier foils 11 is peeled from the current collecting layer 3 to expose the current collecting layer 3 as illustrated in FIG. 5(*f*). With the current collecting layer 3 being exposed, holes 5 are bored through the two current collecting layers 3, the two active material layers 2 and the metallic lithium foil with prescribed perforating means as shown in FIG. 5(*g*). Finally, the other carrier foil 11 is separated from the other current collecting layer 3 to give a desired negative electrode 10.

Third to fifth embodiments of the present invention are described by referring to FIGS. 6 through 9. With respect to the particulars of the third to fifth embodiments that are not referred to hereunder, the description relating to the first and the second embodiments shall be applied appropriately. The members in FIGS. 6 to 9 that are the same as in FIGS. 1 to 5 are given the same numerical references as in FIGS. 1 to 5.

Figure 6:
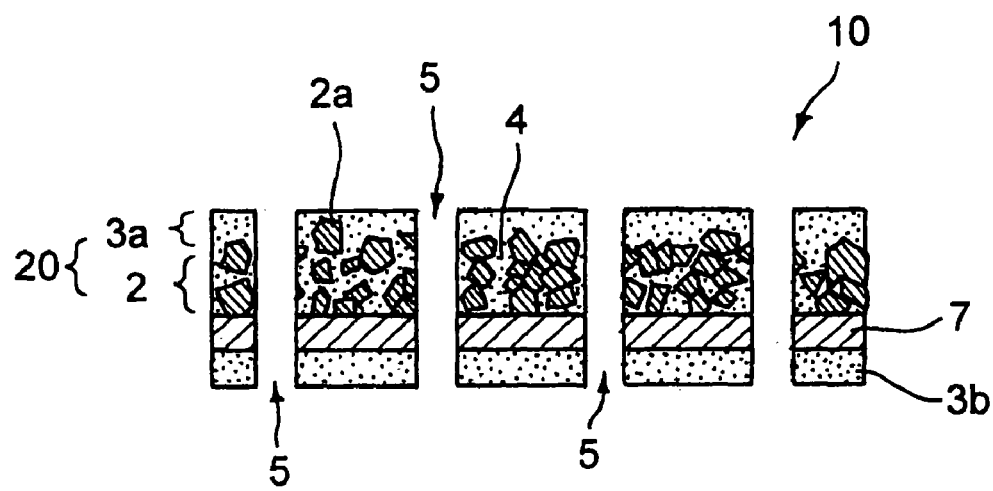
FIG. 6 is a schematic cross-section of a third embodiment of the negative electrode according to the present invention.

The negative electrode 10 shown in FIG. 6 has one active material layer 2 and one metallic lithium layer 7 between a pair of current collecting layers 3*a* and 3*b*. The negative electrode 10 has a large number of holes 5 piercing the thickness thereof. The active material layer 2 and the adjacent current collecting layer 3*a*, are the same as those of the negative electrode precursor 20 used in the negative electrode of the second embodiment. While not shown, micropores are formed in the current collecting layer 3*a* adjacent to the active material layer 2, if desired. On the other hand, micropores are not formed in the current collecting layer 3*b* adjacent to the metallic lithium layer 7.

Figure 7:
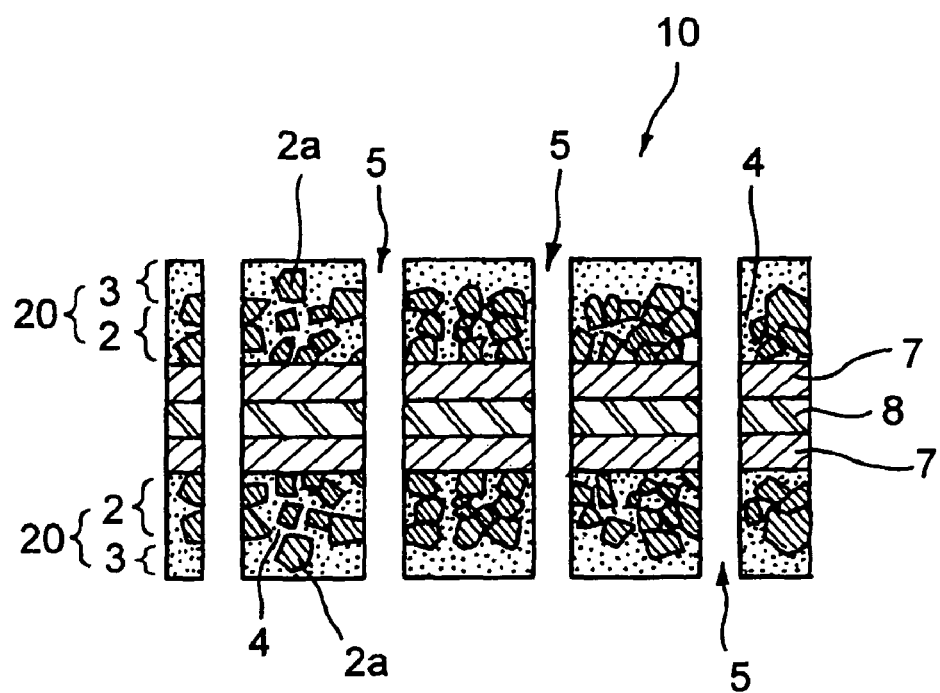
FIG. 7 is a schematic cross-section of a fourth embodiment of the negative electrode according to the present invention.

The negative electrode 10 of the fourth embodiment shown in FIG. 7 has a pair of negative electrode precursors 20 composed of an active material layer 2 and an adjacent current collecting layer 3. The negative electrode 10 also has an electro-conductive foil 8 with a metallic lithium layer 7 on both sides thereof. The electro-conductive foil 8 having a metallic lithium layer 7 on both sides thereof, is sandwiched between the two negative electrode precursors 20, with the active material layers facing each other and with the current collecting layers 3 facing outward. While not shown, the current collecting layers may have micropores formed therein, if desired. The negative electrode 10 has many holes 5 going through the thickness thereof.

The negative electrode 10 of the embodiment shown in FIG. 7 has higher strength than that of the embodiment shown in FIG. 6 owing to the electro-conductive foil 8. This is advantageous in making a battery of jelly-roll configuration. From this viewpoint, it is preferred for the electro-conductive foil 8 to have a thickness of 5 to 20 µm. The electro-conductive foil 8 is typically made of metal. Materials making the electro-conductive foil 8 include metallic materials having low capability of forming a lithium compound. Such materials include those described above as a material of the current collecting layer 3 or a metallic material 4 used in penetration plating. Using a stainless steel foil or a high-strength rolled alloy foil is effective in enhancing the strength.

A preferred process of producing the negative electrode 10 of the fourth embodiment shown in FIG. 7 is as follows. As shown in FIG. 8(*a*), an electro-conductive foil 8 is prepared and a metallic lithium layer 7 is provided on both sides thereof. The metallic lithium layers 7 can be formed by known thin film formation techniques, such as vacuum evaporation. Separately, negative electrode precursors 20, each composed of an active material layer 2 and an adjacent current collecting layer 3, are prepared in accordance with the process of producing the negative electrode of the first embodiment shown in FIG. 2. The electro-conductive foil 8, having metallic lithium layers 7 on, is sandwiched between a pair of the negative electrode precursors 20. Each negative electrode precursor 20 is supported by a carrier foil 11. In this step of uniting, the negative electrode precursors 20 are disposed with their active material layers 2 facing each other, and the current collecting layers facing outward. One of the carrier foil 11 is peeled from the current collecting layer 3 to expose the current collecting layer 3 as shown in FIG. 8(*c*). With one of the current collecting layers 3 being thus exposed, holes 5 are made through the two current collecting layers 3, the two active material layers 2, the two metallic lithium layers 7 and the electro-conductive foil 8 by prescribed perforating means as depicted in FIG. 8(*d*). Finally, the other carrier foil 11 is separated from the other current collecting layer 3 to give a desired negative electrode 10 as shown in FIG. 8(*e*).

Figure 9:
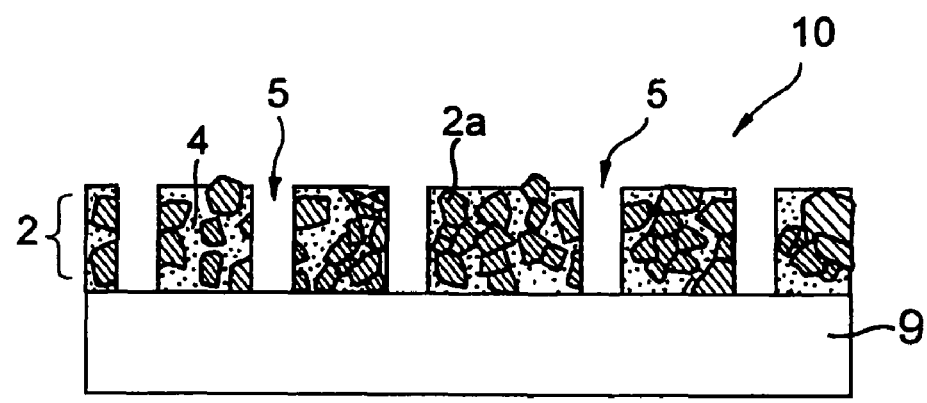
FIG. 9 is a schematic cross-section of a fifth embodiment of the negative electrode according to the present invention.

The negative electrode 10 of the embodiment shown in FIG. 9 has a current collector 9 unlike any of the negative electrodes of the aforementioned embodiments. The negative electrode 10 has an active material layer 2 on the current collector 9. Having the current collector 9, the negative electrode 10 of this embodiment needs no current collecting layer on the active material layer 2. The active material layer 2 contains active material particles 2*a* and has a metallic material 4 having low capability of forming a lithium compound penetrating among the particles 2*a*. The negative electrode 10 has a large number of holes 5 open on the surface of the active material layer 2 and extending through the thickness of the active material layer 2.

The current collector 9 can be of those conventionally used in negative electrodes of nonaqueous secondary batteries. The current collector is preferably made of a metallic material 4 having low capability of forming a lithium compound. Examples of such a metallic material have been recited above. Copper, nickel, stainless steel, etc. are particularly preferred. While the thickness of the current collector 9 is not critical in the present embodiment, it preferably ranges from 10 to 30 µm taking into consideration the balance between strength retention and energy density improvement.

The negative electrode 10 of the present embodiment can be produced in a manner similar to the process of producing the negative electrode of the first embodiment. A slurry containing active material particles 2*a* is applied to one side of a current collector 9 to form a coating layer. The current collector 9 having the coating layer is immersed in a plating bath containing a metallic material having low capability of forming a lithium compound to carry out electroplating. As a result, an active material layer 2 is formed. Finally, the active material layer 2 is subjected to perforation to make a large number of holes 5 extending through the active material layer 2.

While, in the present embodiment, the negative electrode 10 has the active material layer 2 on only one side of the current collector 9, the active material layer 2 may be provided on both sides of the current collector 9, and the holes 5 may be perforated through each of the active material layers 2. The holes 5 may go through the current collector 9.

While the invention has been described with respect to its preferred embodiments, the invention is not construed as being limited thereto, and various changes and modifications can be made therein. For example, in the embodiment shown in FIG. 9, expanded metal may be used as a current collector.

A negative electrode of the present invention may have a structure obtained by uniting a pair of the aforementioned negative electrode precursors 20 with a thick conductor film for current collection, which is called a current collector and has been used in conventional electrodes, sandwiched therebetween and forming holes piercing the resulting unitary laminate in the thickness direction.

In the embodiments shown in FIGS. 4 and 6, the holes 5 do not need to pierce the metallic lithium layer 7. Likewise, in the embodiment shown in FIG. 7, the holes 5 do not need to pierce the metallic lithium layers 7 and the electro-conductive foil 8.

Each of the negative electrodes of the foregoing embodiments can be used either alone as an independent electrode, or as one of negative electrode precursors that are stacked one on another. In the latter application, an electro-conductive foil (e.g., a metal foil) that serves as a core can be interposed between adjacent negative electrode precursors.

While in the aforesaid embodiments each current collecting layer 3 (3a or 3b) has a single layer structure, it may have a multilayer structure composed of two or more sublayers of different materials. For example, the current collecting layer 3 (3a or 3b) may have a double layer structure composed of an inner sublayer made of nickel and an outer sublayer made of copper. This modification is more effective in preventing the negative electrode from being deformed noticeably due to the volumetric change of the active material.

In a case where the material of the current collecting layer 3 (3a or 3b) and the metallic material penetrating the active material layer 2 and having low capability of forming a lithium compound are different, the metallic material penetrating the active material layer 2 and having low capability of forming a lithium compound may penetrate up to the boarder between the active material layer 2 and the current collecting layer 3 (3a or 3b), or pass the boarder to constitute part of the current collecting layer 3 (3a or 3b). Conversely, the material constituting the current collecting layer 3 (3a or 3b) may pass the boarder and exist in the active material layer 2.

EXAMPLES

The present invention will now be illustrated in greater detail with reference to Examples, but it should be understood that the invention is not deemed to be limited thereto.

A negative electrode having the structure shown in FIG. 1, was prepared in accordance with the process illustrated in FIG. 2. A copper carrier foil (thickness: 35 μm) obtained by electrolysis, was cleaned with an acid cleaning solution at room temperature for 30 seconds and then with pure water at room temperature for 30 seconds. The carrier foil was immersed in a 3.5 g/l CBTA solution kept at 40° C. for 30 seconds to form a release layer. After the treatment, the carrier foil was taken out of the solution and washed with pure water for 15 seconds.

A 2.5 wt % solution of polyvinylidene fluoride in N-methylpyrrolidone was applied to the rough side of the carrier foil (Ra=0.5 μm). The solvent vaporized to form a polymer film. The carrier foil coated with the polymer film was electroplated in an $H_2SO_4$/$CuSO_4$-based plating bath containing 250 g/l of $CuSO_4$ and 70 g/l of $H_2SO_4$ at a current density of 5 A/dm$^2$ to form a current collecting layer of copper on the polymer film to a deposit thickness of 9 μm. The carrier foil taken out of the plating bath was washed with pure water for 30 seconds and dried in the atmosphere.

A slurry containing active material particles was applied to the current collecting layer to a thickness of 20 μm to form an active material layer. The active material particles were silicon particles having a median diameter $D_{50}$ of 2 μm. The slurry contained the active material, acetylene black, and styrene-butadiene rubber at a ratio of 98:2:1.7.

The carrier foil having the active material layer formed thereon, was immersed in a Watts bath having the composition below and plated with nickel by penetration plating at a bath temperature of 50° C., a bath pH of 5, and a current density of 5 A/dm$^2$. A nickel anode and a direct current power source were used for electrolysis. The penetration plating was stopped when part of the active material particles were still exposed on the plated surface. The carrier foil taken out of the plating bath was washed with pure water for 30 seconds and dried in the atmosphere.

Watts Bath Composition:

| | |
|---|---|
| $NiSO_4.6H_2O$ | 250 g/l |
| $NiCl_2.6H_2O$ | 45 g/l |
| $H_3BO_3$ | 30 g/l |

The carrier foil was immersed in an Cu-based plating bath containing 200 g/l of $H_3PO_4$ and 200 g/l of $Cu_3(PO_4)_2.3H_2O$ and electroplated at a bath temperature of 40° C. at a current density of 5 A/dm$^2$ to form a current collecting layer of copper on the active material layer to a deposit thickness of 8 μm. The carrier foil taken out of the plating bath was washed with pure water for 30 seconds and dried in the atmosphere.

A YAG laser beam was applied to the current collecting layer formed on the active material layer to bear 25 μm diameter holes through the two current collecting layers and the active material layers between the current collecting layers regularly at a pitch of 100 μm (10000 holes per square centimeter).

Finally, the carrier foil was peeled off the adjacent current collecting layer to give a negative electrode for a nonaqueous secondary battery having a pair of current collecting layers and an active material layer between the current collecting layers. The appearances of the resulting negative electrode before use and after the 1st cycle are shown in FIG. 10. Scanning electron micrographs of the surfaces and a cross-section of the resulting negative electrode are presented in FIG. 11. As a result of observation under a scanning electron microscope, it was confirmed that there were 30 micropores in average in a 100 μm-side square of the current collecting layer that had been separated from the carrier foil.

Example 2

A negative electrode shown in FIG. 4 was prepared in accordance with the process illustrated in FIG. 5. A 2.5 wt % solution of polyvinylidene fluoride in N-methylpyrrolidone was applied to the rough side of a carrier foil (Ra=0.5 μm). After the solvent vaporized to form a polymer film, the carrier foil was immersed in an $H_2SO_4$/$CuSO_4$-based plating bath containing 250 g/l of $CuSO_4$ and 70 g/l of $H_2SO_4$ and electroplated at a current density of 5 A/dm$^2$ to form a current collecting layer of copper having a thickness of 5 μm on the polymer film. The carrier foil taken out of the plating bath was washed with pure water for 30 seconds and dried in the atmosphere.

A slurry containing negative electrode active material particles was applied to the current collecting layer to a thickness of 15 μm to form an active material layer. The active material particles were silicon particles having a median diameter $D_{50}$ of 2 μm. The slurry contained the active material, acetylene black, and styrene-butadiene rubber at a ratio of 98:2:1.7.

The carrier foil having the active material layer formed thereon, was immersed in a Watts bath having the composition below, and the active material layer was plated with nickel by penetration plating at a bath temperature of 50° C., a bath pH of 5, and a current density of 5 A/dm$^2$. A nickel anode and a direct current power source were used for electrolysis. The carrier foil taken out of the plating bath was washed with pure water for 30 seconds and dried in the atmosphere to give a negative electrode precursor as supported on the carrier foil.

Watts Bath Composition:

| | |
|---|---|
| NiSO$_4$.6H$_2$O | 250 g/l |
| NiCl$_2$.6H$_2$O | 45 g/l |
| H$_3$BO$_3$ | 30 g/l |

A separately prepared 25 μm thick metallic lithium foil was sandwiched between a pair of negative electrode precursors thus prepared. The two negative electrode precursors were paired with their active material layers facing each other. The negative electrode precursors and the metallic lithium were thus united.

One of the carrier foils was peeled off the current collecting layer to expose the current collecting layer. A YAG laser beam was applied to the exposed current collecting layer to regularly perforate 25 μm diameter holes going through the two negative electrode precursors and the metallic lithium foil at a pitch of 100 μm (10000 holes per square centimeter). Finally, the other carrier foil was peeled off the other current collecting layer to give a desired negative electrode. The amount of the metallic lithium in the negative electrode was 30% of the saturated reversible capacity of the active material.

Example 3

A negative electrode shown in FIG. 6 was prepared. A negative electrode precursor supported on a carrier foil was made in the same manner as in Example 2. Separately, a 10 μm thick metallic lithium layer was formed on a side of a 5 μm thick copper foil (current collecting layer) by vacuum evaporation. The metallic lithium layer on the copper foil and the active material layer of the negative electrode precursor, were brought into contact with each other to unite the copper foil and the negative electrode precursor.

A YAG laser beam was applied to the copper foil to regularly perforate 25 μm diameter holes going through the copper foil, the metallic lithium foil, and the negative electrode precursor at a pitch of 100 μm (10000 holes per square centimeter). Finally, the carrier foil was peeled off the current collecting layer to give a desired negative electrode. The amount of the metallic lithium in the negative electrode was 25% of the saturated reversible capacity of the active material.

Example 4

A negative electrode shown in FIG. 7 was prepared in accordance with the process shown in FIG. 8. Negative electrode precursors supported on respective carrier foils were made in the same manner as in Example 2. Separately, a 10 μm thick metallic lithium layer was formed on each side of a 10 μm thick copper foil by vacuum evaporation. The copper foil was sandwiched between a pair of the negative electrode precursors prepared above. The negative electrode precursors were paired with the active material layers facing each other and the current collecting layers facing outward. The copper foil having the metallic lithium layer on both sides thereof and the negative electrode precursors were thus united.

One of the carrier foils was peeled from the current collecting layer to expose the current collecting layer. A YAG laser beam was applied to the exposed current collecting layer to regularly perforate 25 μm diameter holes going through the negative electrode precursors and the copper foil having the metallic lithium layer on both sides thereof at a pitch of 100 μm (10000 holes per square centimeter). Finally, the other carrier foil was peeled off the other current collecting layer to give a desired negative electrode. The amount of the metallic lithium in the negative electrode was 25% of the saturated reversible capacity of the active material.

Example 5

A pair of negative electrode precursors were obtained in the same manner as in Example 4. A YAG laser beam was applied to the exposed current collecting layer of each negative electrode precursor to regularly perforate 25 μm diameter holes going through the negative electrode precursor at a pitch of 100 μm (10000 holes per square centimeter).

A copper foil having a metallic lithium layer on both sides thereof, which was prepared in the same manner as in Example 4, was sandwiched in between a pair of the perforated negative electrode precursors, with the active material layers facing each other, and the current collecting layers facing outward. The copper foil with the metallic lithium layer on both sides thereof and the negative electrode precursors were thus superposed and united together. Finally, the carrier foils were separated from the respective current collecting layers to give a desired negative electrode. The amount of the metallic lithium in the negative electrode was 27% of the saturated reversible capacity of the active material.

Example 6

A negative electrode was obtained in the same manner as in Example 5, except for changing the diameter and pitch of the holes to 15 μm and 100 μm (10000 holes/cm$^2$), respectively.

Example 7

A negative electrode was obtained in the same manner as in Example 5, except for changing the diameter and pitch of the holes to 25 μm and 200 μm (2500 holes/cm$^2$), respectively.

Example 8

A negative electrode was obtained in the same manner as in Example 5, except for changing the diameter and pitch of the holes to 50 μm and 100 μm (10000 holes/cm$^2$), respectively.

Example 9

A negative electrode was obtained in the same manner as in Example 5, except for changing the diameter and pitch of the holes to 50 μm and 200 μm (2500 holes/cm$^2$), respectively.

Example 10

A negative electrode was obtained in the same manner as in Example 5, except for changing the diameter and pitch of the holes to 100 μm and 300 μm (1111 holes/cm$^2$), respectively.

Example 11

A negative electrode was obtained in the same manner as in Example 5, except for changing the diameter and pitch of the holes to 250 μm and 1000 μm (100 holes/cm²), respectively.

Example 12

A negative electrode was obtained in the same manner as in Example 5, except that the penetration plating of the active material layer in the preparation of the negative electrode precursors was carried out using a copper pyrophosphate bath having the composition shown below under the conditions shown below.

Composition of Copper Pyrophosphate Bath:

| | |
|---|---|
| $K_4P_2O_7$ | 450 g/l |
| $Cu_2P_2O_7 \cdot 3H_2O$ | 105 g/l |
| $KNO_3$ | 15 g/l |

Conditions of Penetration Plating:
  Current density: 3 A/dm²
  Bath temperature: 55° C.
  pH: 8.2
  Anode: DSE electrode

Example 13

A negative electrode was obtained in the same manner as in Example 10, except that the perforation was carried out mechanically with a punch in place of YAG laser machining.

Example 14

A negative electrode was obtained in the same manner as in Example 10, except that the perforation was carried out by sandblasting in place of YAG laser machining.

Example 15

A negative electrode shown in FIG. 9 was prepared. A slurry containing negative electrode active material particles was applied to a side of an 18 μm thick electrolytic copper foil to a thickness of 20 μm to form an active material layer. The active material particles were Si particles having a median particle size $D_{50}$ of 2 μm. The slurry contained the active material, acetylene black, and styrene-butadiene rubber at a ratio of 98:2:1.7. The active material layer was subjected to penetration plating with nickel under the same conditions as used in Example 1. A YAG laser beam was applied to the active material layer to regularly bear 25 μm diameter holes at a pitch of 100 μm (10000 holes per square centimeter).

Comparative Example 1

A negative electrode for a nonaqueous secondary battery was obtained by forming an active material layer on each side of an electrolytic copper foil (thickness: 35 μm) by applying the same slurry as used in Example 1 to a thickness of 15 μm.

Evaluation of Performance:
A nonaqueous secondary battery was assembled using each of the negative electrodes obtained in Examples and Comparative Example as follows. The battery was evaluated in discharge capacity after the 1st cycle, irreversible capacity after the 1st cycle, capacity retention after the 100th cycle, charge/discharge efficiency after the 100th cycle, and rate of change in negative electrode thickness in accordance with the following methods. The results of evaluation are shown in Table 1 below.

Preparation of Nonaqueous Secondary Battery:
Each of the negative electrodes obtained in Examples and Comparative Example and $LiCoO_2$ were used as a working electrode and a counter electrode (positive electrode), respectively. The electrodes were placed to face each other with a separator between them and assembled into a nonaqueous secondary battery in a usual manner. An $LiPF_6$ solution in a mixture of ethylene carbonate and diethyl carbonate (1:1 by volume) was used as a nonaqueous electrolyte. Two kinds of batteries were prepared per sample negative electrode; one having a positive to negative electrode capacity ratio of 1:1 and the other 1:2. The batteries having a positive to negative electrode capacity ratio of 1:1 were used to measure the discharge capacity after the 1st cycle and the irreversible capacity after the 1st cycle. Those having the ratio of 1:2 were used to measure the capacity retention after the 100th cycle, the charge/discharge efficiency after the 100th cycle, and the rate of change in negative electrode thickness.

Discharge Capacity After One Cycle:
The discharge capacities per unit weight and unit volume were measured. The discharge capacity per unit weight was calculated based on the weight of the active material (Si), and the discharge capacity per unit volume was calculated based on the volume of the negative electrode. Expansion of the negative electrode during charging was not taken into account.

Irreversible Capacity After One Cycle:
An irreversible capacity, represented by equation shown below, indicates the part of the charge capacity that is not discharged and remains in the active material.

Irreversible capacity (%)=(1−first discharge capacity/ first charge capacity)×100

Capacity Retention After the 100th Cycle:
The discharge capacity after the 100th cycle was measured. The measured value was divided by the maximum negative electrode discharge capacity and the quotient was multiplied by 100.

Charge/Discharge Efficiency After 100 Cycles:

Charge/discharge efficiency (%) after 100 cycles=discharge capacity after the 100th cycle/ charge capacity after the 100th cycle×100

Rate of Change in Thickness of Negative Electrode:
The change of the negative electrode in thickness, as a result of a charge in the first cycle, was obtained by measuring a change in total thickness of the negative electrode, the separator, and the positive electrode ($LiCoO_2$) with a displacement sensor (HS Cell, available from Hohsen Corp.). Because the positive electrode expands only a little with a charge and a discharge cycle, the change of the total thickness is mostly ascribed to the thickness change of the negative electrode. Accordingly, the measured thickness change is substantially regarded as the change of the negative electrode. The rate of change in negative electrode thickness is calculated from equation:

Rate of change in negative electrode thickness (%)= [(thickness after the first charge)−(thickness before the charge)]/thickness before the charge× 100

TABLE 1

|  | Discharge Capacity after the 1st Cycle*[1] (mAh/g) | Discharge Capacity after the 1st Cycle*[2] (mAh/cc) | Irreversible Capacity after the 1st Cycle (%) | Capacity Retention after the 100th Cycle (%) | Charge/ Discharge Efficiency after the 100th Cycle (%) | Rate of Change in Negative Electrode Thickness (%) |
|---|---|---|---|---|---|---|
| Example 1 | 3500 | 1842 | 10 | 85 | 99.5 | 30 |
| Example 2 | 3800 | 1754 | 3 | 90 | 100 | 13 |
| Example 3 | 3800 | 1629 | 3 | 92 | 99.9 | 10 |
| Example 4 | 3900 | 1671 | 3 | 95 | 100 | 8 |
| Example 5 | 3850 | 1650 | 3 | 95 | 100 | 10 |
| Example 6 | 3800 | 1677 | 4 | 87 | 99.8 | 13 |
| Example 7 | 3800 | 1687 | 4 | 86 | 99.8 | 12 |
| Example 8 | 3750 | 1364 | 5 | 80 | 99.6 | 15 |
| Example 9 | 3850 | 1650 | 3 | 96 | 100 | 7 |
| Example 10 | 3850 | 1577 | 3 | 92 | 99.9 | 10 |
| Example 11 | 3800 | 1629 | 5 | 85 | 99.6 | 18 |
| Example 12 | 3850 | 1650 | 3 | 97 | 100 | 9 |
| Example 13 | 3700 | 1516 | 5 | 81 | 99.2 | 10 |
| Example 14 | 3700 | 1516 | 6 | 85 | 99.5 | 10 |
| Example 15 | 3500 | 1793 | 10 | 80 | 99.3 | 30 |
| Comparative Example 1 | 1900 | 570 | 30 | 5 | 98 | 160 |

*[1]Per unit weight of active material (Si)
*[2]Per unit volume of negative electrode (no consideration given to expansion during a charge)

As is apparent from the results shown in Table 1, the batteries using the negative electrodes of Examples have high discharge capacities, small irreversible capacities, high capacity retentions, high charge/discharge efficiencies, and small rates of change in negative electrode thickness.

As described above in detail, the holes in the thickness direction of the active material layer sufficiently accommodate the stress arising from volumetric change of the active material accompanying charge/discharge cycling and thereby prevent noticeable deformation of the negative electrode. As a result, a greatly prolonged cycle life and an increased charge/discharge efficiency are obtained. The active material layer has a metallic material deposited among the active material particles. Therefore, if the active material particles pulverize with charges and discharges, generation of electrically isolated active material particles is effectively prevented, which assures sufficient current collecting capabilities of the negative electrode.

What is claimed is:

1. A negative electrode for a nonaqueous secondary battery having an active material layer containing particles of an active material,
the active material layer having a metallic material which is deposited among the particles and is continuously filled between the active material particles over an entire thickness direction of the active material layer,
the negative electrode having a large number of holes open on at least one side thereof and extending through the entire thickness of the active material layer, the holes open on a surface of the negative electrode having an opening diameter of 20 to 500 μm and the holes go through an entire thickness of the negative electrode, and
the metallic material having a low capability of forming a lithium compound and having electroconductivity,
wherein vacant spaces are formed such that the metallic material does not completely fill interstitial spaces between the particles, whereby the vacant spaces serve to relax the stress caused by volumetric changes of the active material particles accompanying charge and discharge cycles.

2. The negative electrode for a nonaqueous secondary battery according to claim 1, further having a current collecting layer adapted to be brought into contact with an electrolyte, wherein
the active material layer is on the inner side of the current collecting layer, and
the holes extend through the thicknesses of the current collecting layer and the active material layer.

3. The negative electrode for a nonaqueous secondary battery according to claim 2, having a pair of the current collecting layers, wherein the active material layer is between the pair of the current collecting layers.

4. The negative electrode for a nonaqueous secondary battery according to claim 3, wherein at least one of the pair of the current collecting layers has a thickness of 0.3 to 10 μm.

5. The negative electrode for a nonaqueous secondary battery according to claim 4, wherein the pair of the current collecting layers each have a thickness of 0.3 to 10 μm.

6. A negative electrode for a nonaqueous secondary battery comprising:
an active material layer containing particles of an active material, the active material layer having a metallic material deposited among the particles by electroplating;
a large number of holes open on at least one side the negative electrode and extending through the thickness of the active material layer;
a pair current collecting layers adapted to be brought into contact with an electrolyte;
wherein the active material layer is on the inner side of each current collecting layer and between the pair of the current collecting layers;
the holes extend through the thicknesses of the pair of current collecting layers and the active material layer; and a metallic lithium layer between the pair of the current collecting layers.

7. The negative electrode for a nonaqueous secondary battery according to claim 6, having a pair of the active material layers, wherein the metallic lithium layer is between the pair of the active material layers.

8. The negative electrode for a nonaqueous secondary battery according to claim 7, having a pair of the metallic lithium layers and an electro-conductive foil between the pair of the metallic lithium layers.

9. The negative electrode for a nonaqueous secondary battery according to claim 1, wherein the holes open on the surface of the negative electrode have an open area ratio of 0.3% to 30%.

10. The negative electrode for a nonaqueous secondary battery according to claim 1, wherein the holes open on the surface of the negative electrode have an opening diameter of 5 to 500 µm.

11. The negative electrode for a nonaqueous secondary battery according to claim 1, wherein the holes go through the thickness of the negative electrode.

12. The negative electrode for a nonaqueous secondary battery according to claim 1, wherein the holes are formed by laser machining.

13. The negative electrode for a nonaqueous secondary battery according to claim 1, wherein the holes are formed by mechanical perforation.

14. A negative electrode for a nonaqueous secondary battery comprising a stack of a plurality of negative electrode precursors, the negative electrode precursors being the negative electrode according to claim 1.

15. The negative electrode for a nonaqueous secondary battery according to claim 14, wherein adjacent negative electrode precursors have an electro-conductive foil interposed therebetween.

16. A nonaqueous secondary battery having the negative electrode according to claim 1.

17. The negative electrode for a nonaqueous secondary battery according to claim 1, further comprising an electro-conductive carbon material in addition to the active material particles to give further improved electron conductivity to the negative electrode.

18. The negative electrode for a nonaqueous secondary battery according to claim 1, wherein a size of the particles is about 0.01 µm to 30 µm.

19. The negative electrode for a nonaqueous secondary battery according to claim 1, wherein a number of holes field on a surface of the negative electrode is about 100 to 250,000 per $cm^2$.

20. The negative electrode for a nonaqueous secondary battery according to claim 1, wherein the metallic material comprises copper, nickel, iron, cobalt or alloys of these metals.

21. The negative electrode for a nonaqueous secondary battery according to claim 1, wherein the vacant spaces are between about 0.5% to 5% by volume.

* * * * *